(12) United States Patent
Jordan (10) Patent No.: US 9,477,776 B2
(45) Date of Patent: Oct. 25, 2016

(54) SYSTEM AND METHOD FOR VISUALIZATION OF DATA

(75) Inventor: Ian Jordan, Surrey (GB)

(73) Assignee: PAYPAL, INC., San Jose, CA (US)

(*) Notice: Subject to any disclaimer, the term of this patent is extended or adjusted under 35 U.S.C. 154(b) by 1026 days.

(21) Appl. No.: 12/061,007

(22) Filed: Apr. 2, 2008

(65) Prior Publication Data

US 2009/0254557 A1    Oct. 8, 2009

(51) Int. Cl.
*G06F 7/00* (2006.01)
*G06F 17/30* (2006.01)
*G06F 17/00* (2006.01)

(52) U.S. Cl.
CPC ... *G06F 17/30905* (2013.01); *G06F 17/30017* (2013.01); *G06F 17/30244* (2013.01); *G06F 17/30265* (2013.01); *G06F 17/30781* (2013.01); *G06F 17/30994* (2013.01)

(58) Field of Classification Search
CPC .................. G06F 17/30017; G06F 17/30265; G06F 17/30244; G06F 17/30781; G06F 17/30905; G06F 17/30994
USPC ............................. 707/781, 999.001–999.005
See application file for complete search history.

(56) References Cited

U.S. PATENT DOCUMENTS

| | | | | |
|---|---|---|---|---|
| 6,128,655 A | * | 10/2000 | Fields et al. | 709/219 |
| 2004/0111360 A1 | * | 6/2004 | Albanese | 705/38 |
| 2004/0225844 A1 | * | 11/2004 | Thompson et al. | 711/145 |
| 2005/0246752 A1 | * | 11/2005 | Liwerant et al. | 725/109 |
| 2006/0089843 A1 | * | 4/2006 | Flather | 705/1 |
| 2007/0043766 A1 | * | 2/2007 | Nicholas et al. | 707/104.1 |
| 2007/0161382 A1 | * | 7/2007 | Melinger et al. | 455/456.1 |
| 2008/0019353 A1 | * | 1/2008 | Foote | 370/352 |
| 2009/0049070 A1 | * | 2/2009 | Steinberg | 707/101 |

* cited by examiner

*Primary Examiner* — Kannan Shanmugasundaram
(74) *Attorney, Agent, or Firm* — Maschoff Brennan (57) ABSTRACT

Embodiments of computer implemented methods and systems for visualization of data are described. One example embodiment includes receiving authentication data related to a user, establishing an identity of the user based on the user authentication data, and receiving profile data associated with the user in response to the establishing of the identity of the user. The example embodiment may further include receiving transaction data associated with the user, selectively aggregating the profile data with the transaction data as aggregated user data, visualizing the aggregated user data as a data visualization, the data visualization being a composition of visual media corresponding to the aggregated data, and providing an address to the data visualization such that the data visualization may be referred to in other applications.

25 Claims, 10 Drawing Sheets

Share my information

To protect your account, you are required to consent before we share your information with another company. Please note: We will not share your password or credit card information.

We strongly encourage you to read terms and conditions and privacy policy because these policies will affect your use of their services. We do not manage policies set by third-party companies.

By clicking on the "I agree" button, you're authorizing us to share your information.

I agree     No thanks, please return me to Home Page

FIG 8

Thank you for your registration.

Cut and paste this code into your website:

<img src="http://projectsue.ebaydevelopment.co.uk/gkhayet"/>

Or add it to your iGoogle homepage by clicking here

FIG 9 iGoogle is a more personal way to use Google.com. Customize your page anyway you like, by adding your favorite themes and gadgets from across the web.

Add to Google

SYSTEM AND METHOD FOR VISUALIZATION OF DATA

FIELD

This application relates generally to data processing, and more specifically to a system and method for visualization of data.

BACKGROUND

Visualization of user data may be important in various contexts.

BRIEF DESCRIPTION OF DRAWINGS

Embodiments are illustrated by way of example and not limitation in the figures of the accompanying drawings, in which like references indicate similar elements and in which.

DETAILED DESCRIPTION

Visual presentation of data is more efficient than textual presentation of data. Systems and methods of visualization of data, in some example embodiments, may permit visual presentation of advertisements tailored to a specific user. In some other example embodiments, systems and methods of visualization of data may be utilized to create visualizations of user personality.

It may be difficult to create targeted advertisements unless sufficient user data is available. However, in order to access user data, the user needs to be recognized. Systems and methods of visualization of data may require that the user be positively authenticated before visualization of data is performed.

In some example embodiments, a user may be requested to agree to presentation of targeted advertisements while logged in on an electronic marketplace (e.g., eBay). To target advertisements to a user, systems and methods for visualization of data may need to obtain data. The user data may be obtained from various data sources. For example, the user data may be obtained from an electronic marketplace profile associated with the user, from historical transactions associated with the user, or from third parties. Furthermore, the user may be asked to provide additional data.

Based on the user data received, systems and methods of visualization of data may create personalized advertisements that are displayed to the user dynamically. Data visualization, created from the dynamically obtained data, may include demographic data such as, for example, user age. The demographic data may dictate the type of advertisement being offered. This approach may succeed because younger users may be more likely to spend money on fashion clothing and CDs whereas older users may spend more on home improvement. Furthermore, the transaction data may reveal recent purchases made by the user. Accordingly, merchandise related to the recent purchases may be advertised to the user. Thus, for example, if it is determined that the user has recently purchased a Blu-Ray Disc player, Blu-Ray disks may be advertised to the user.

In some example embodiments, based on the data obtained, data visualization may be created that is utilized as the user personality card. For example, the weather conditions in the user's location may be obtained dynamically from a weather forecaster and visualized as an image depicting a sun or rain and inserted in an email along with other user related data.

The data visualization may be composed of multiple data elements visualized and joined together. For example, user instant messenger (e.g., Skype) identification may be joined with the local weather and the user name and displayed as a personalized logo on the user social service website (e.g., MySpace, Facebook). The images correlating to textual data and representing components in data visualization may be obtained from an image database. Data visualization may be generated dynamically from the currently available data and recreated on each subsequent request.

In some example embodiments, data visualization may be utilized as the user's personalized signature. In some other example embodiments, a data visualized may be represented by an avatar created based on the user data. The avatar may be used for instant messengers as well as for social service websites. The data visualized may include the user's favorite football team or favorite colors, email and telephone number. The data visualization may subsequently be stored as web resource.

In the context of an electronic marketplace, data visualization may provide the information about user feedback, positive and negative score, or trade volume. The systems and methods for data visualization are not limited to static images and may include videos or animations (e.g. Adobe® Flash®) embedded in a web page). An example network environment 100 in which the systems and methods for visualization of data may be implemented is illustrated in FIG. 1.

Figure 1:
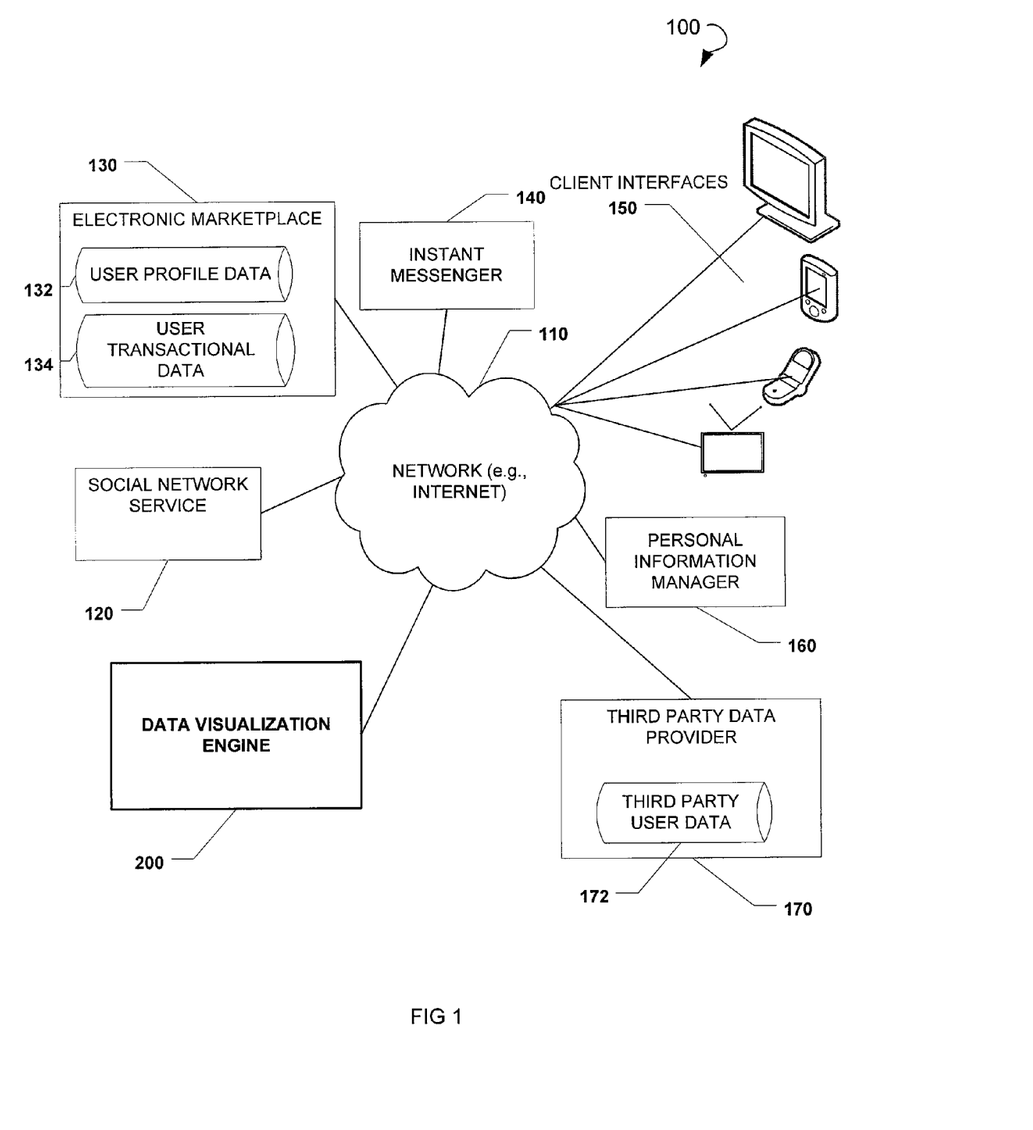
FIG. 1 is a block diagram illustrating an environment within which embodiments of systems and methods for visualization of data may be implemented, in accordance with an example embodiment.

As shown in FIG. 1, the network environment 100 may include a network 110, a social network service 120, an electronic marketplace 130, an instant messenger 140, client systems 150, a personal information manager 160, a third party data provider 170, and a data visualization engine 200. The electronic marketplace 130 may further include a user profile data 132 and a user transactional data 134. The third party data provider 170 may further include a third party user data 172.

The network 110 may be a network of data processing nodes that are interconnected for the purpose of data communication (e.g., the Internet). The social network service 120, shown in the context of the network environment 100, may be utilized to provide online social networks for communities of people who share interests and activities or who are interested in exploring the interests and activities of others. The social network service (e.g., Facebook) may be primarily web based and provide a collection of various ways for users to interact, such as chat, messaging, email, video, voice chat, file sharing, blogging, and discussion groups.

The electronic marketplace 130 is a community of buyers and sellers (e.g., eBay) buying and selling by bidding at electronic marketplace auctions or by paying fixed prices. The electronic marketplace 130 may further include the user profile data 132 and the user transaction data 134. The instant messenger 140 may be configured to provide a form of real-time communication between two or more people based on typed text. The text exchanged between instant messenger clients may be conveyed via computers connected over a network such as the network 110.

The client systems 150 may include devices featuring a display that are configured to permit user interaction. The client systems 150 may display graphical icons, visual indicators, special graphical elements called "widgets", and any other feature commonly used in graphical user interfaces. The graphical icons provided may be used in conjunction with text, labels or text navigation to fully represent the information and actions available to a user. A user may perform actions through direct manipulation of the graphical elements.

The personal information manager 160, in some example embodiments, is a type of application software that may function as a personal organizer. The personal information manager 160 may facilitate the recording, tracking, and management of certain types of "personal information". The personal information manager 160 may include personal notes/journal, address books, task lists, significant calendar dates, birthdays, anniversaries, appointments and meeting, reminders, email, instant message archives, fax communications, voicemail, and/or project management features. The personal information manager 160 may be configured to acquire, organize, maintain, retrieve and use information items such as documents (paper-based and digital), web pages and email messages.

The third party data provider 170 may be configured to obtain and provide personal records and business records. The third party data provider 170 may comprise the third party user data 172. The third party user data 172 may include names, birthday and anniversary dates, addresses, telephone numbers, Fax numbers, and e-mail addresses. The business records may include business transactions associated with or related to a person. The data visualization engine 200 is described with reference to FIG. 2.

Figure 2:
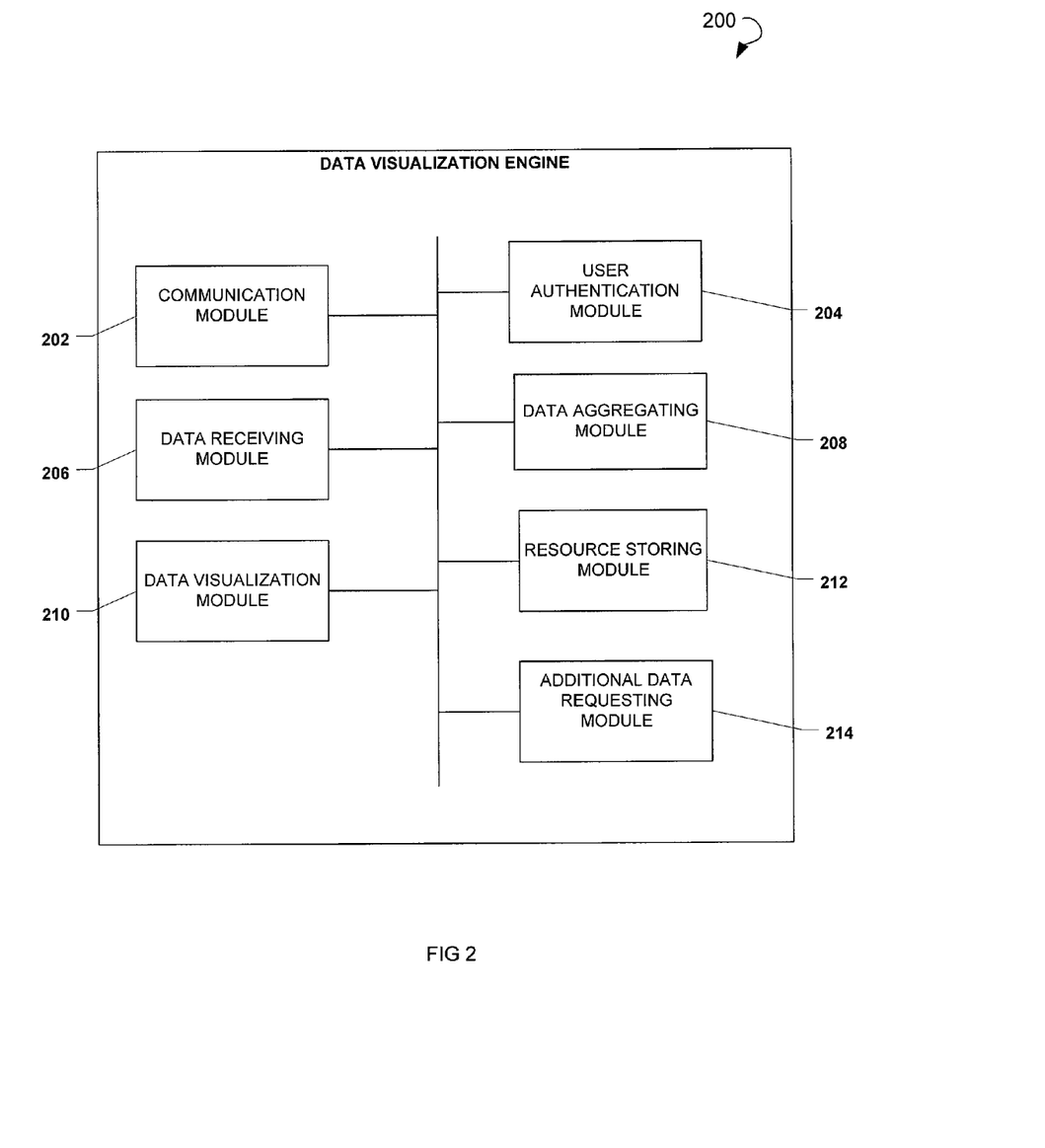
FIG. 2 is a block diagram illustrating an embodiment of a data visualization engine, in accordance with an example embodiment.

FIG. 2 is a block diagram illustrating a data visualization engine, in accordance with an example embodiment. The data visualization engine 200, in some example embodiments, may include a communication module 202, a user authentication module 204, a data receiving module 206, a data aggregating module 208, a data visualization module 210, a resource storing module 212, and an additional data requesting module 214.

The communication module 202, in some example embodiments, may be configured to receive user authentication data. For example, a user may be asked to provide user authentication such as two text strings including user identification (ID) and a password. Upon receiving the user authentication data, the user authentication module 204 may establish the identity of the user based on the user authentication data. Once the user is positively identified, a user session may be created and the user may then navigate a website, such as the electronic marketplace 130 without re-establishing the identity.

The receiving module 206 may be configured to receive the user profile data 132 based on the identity of the user established by the user authentication module 204. The receiving module 206 may further be configured to receive the user transaction data 134. The user transaction data 134 may include data related to the user actions with respect to the electronic marketplace 130 and include a history of financial transactions and user community feedback.

In some example embodiments, some of the user profile data 132 and the user transaction data 134 may be received from the third party data provider 170 as a part of the third party user data 172. A user's permission may be requested before data from the third party data provider 170 is received. The aggregating module 208 may be configured to aggregate the data received by the receiving module 206 from various above-mentioned data sources. In some example embodiments, the aggregating module 208 may aggregate the data selected as pertinent to the objectives of subsequent data visualization.

Thus if the data visualization is intended to be utilized as a targeted advertisement, a user address included in the user profile data 132 may not be relevant. Accordingly, the user address may not be selected to be aggregated by the data aggregating module 208. The aggregation of data by the aggregating module 208 may produce aggregated user data to be utilized by the data visualization module 210. The data visualization module 210 may be configured to visualize the aggregated user data as a data visualization. The data visualization, in some example embodiments, is a composition of visual data corresponding to the respective aggregated data. The data visualization may be represented by an image or a video.

The resource storing module 212 may be configured to store the data visualization produced by the data visualization module 210. In some example embodiments, the data visualization may be stored as a web resource. The data visualization stored as a web resource may, in some example embodiments, be static, displaying the same visual data upon each access. The data visualization may, in some other embodiments, be dynamic (recreated on each access) based on the updated aggregated data.

In some example embodiments, the additional data requesting module 214 may request the user to provide additional data. For example, it may be determined that the profile data is insufficient to create a data visualization representing user personality. Accordingly, the user may be requested to provide additional data. The additional data may be combined with the data available from the above-mentioned data sources and aggregated by the data aggregating module 208 to produce enhanced aggregated data.

Figure 3:
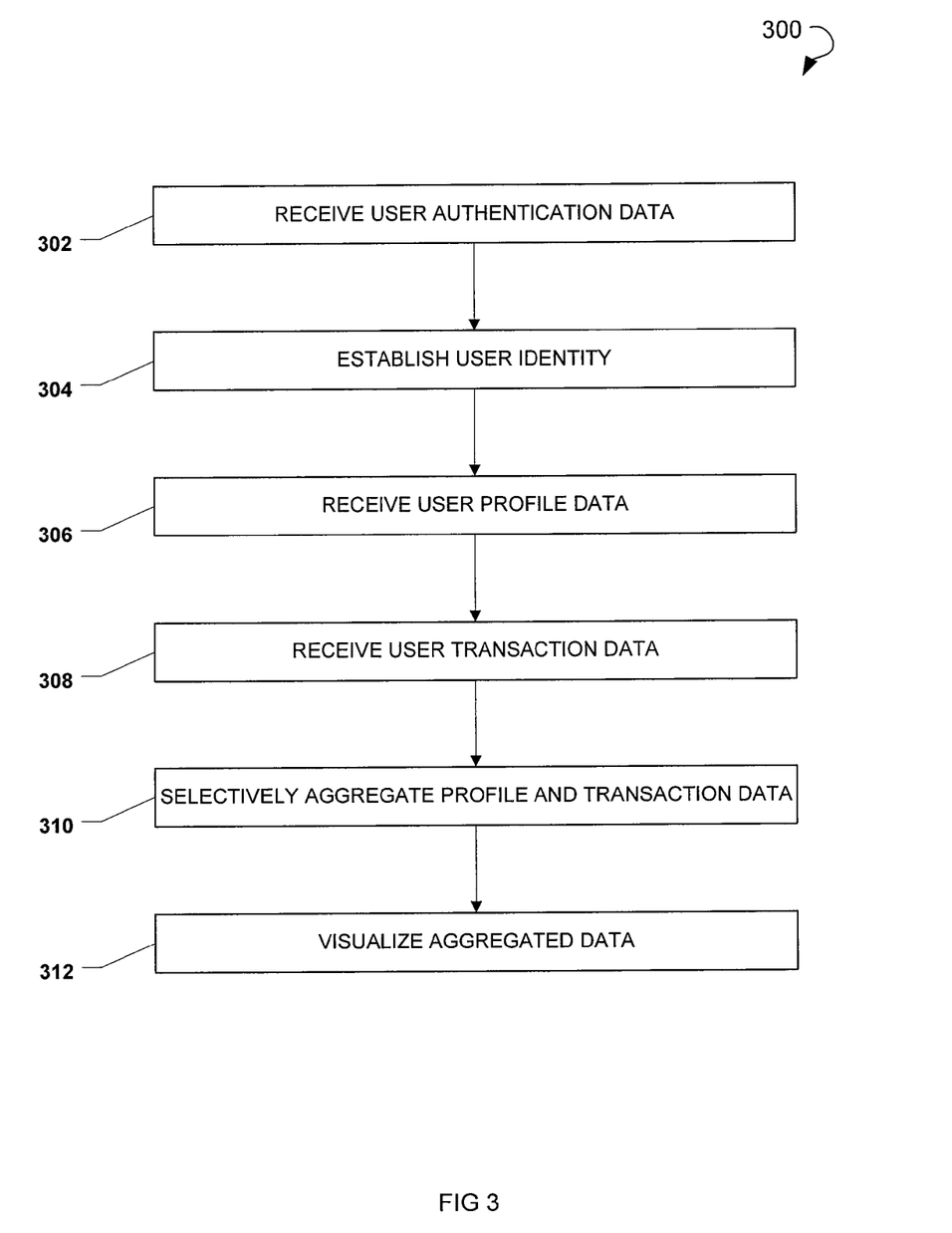
FIG. 3 is a flow chart illustrating an embodiment of a method for visualization of data, in accordance with an example embodiment.

FIG. 3 is a flow chart illustrating a method for visualization of data, in accordance with an example embodiment. The method 300 may be performed by processing logic that may comprise hardware (e.g., dedicated logic, programmable logic, microcode, etc.), software (such as software run on a general purpose computer system or a dedicated machine), or a combination of both. In one example embodiment, the processing logic resides at the data visualization engine 200, illustrated in FIG. 2. The method 300 may be performed by the various modules discussed above with reference to FIG. 2. Each of these modules may comprise processing logic.

As shown in FIG. 3, the method 300 may commence at operation 302, with the communication module 202 receiving user authentication data. For example, upon clicking on a hyperlink that reads "sign in" a user may be taken to a sign-in webpage of the electronic marketplace 130 where the user may provide his authentication data such a user ID and a password. At operation 304 the user authentication module 204 may establish the identity of the user based on the user authentication data received at operation 302.

At operation 306, the receiving module 206 may receive user profile data 132 associated with the user based on the identity of the user established at operation 304. At operation 308 the receiving module 206 may receive the user transaction data 134 and at operation 310 the data aggregating module 208 may selectively aggregate the profile data received at operation 306 with the transaction data received at operation 308. At operation 312, the data visualization module 210 may visualize the aggregated user data. The data visualization may be a composition of visual media corresponding to the aggregated data.

Figure 4:
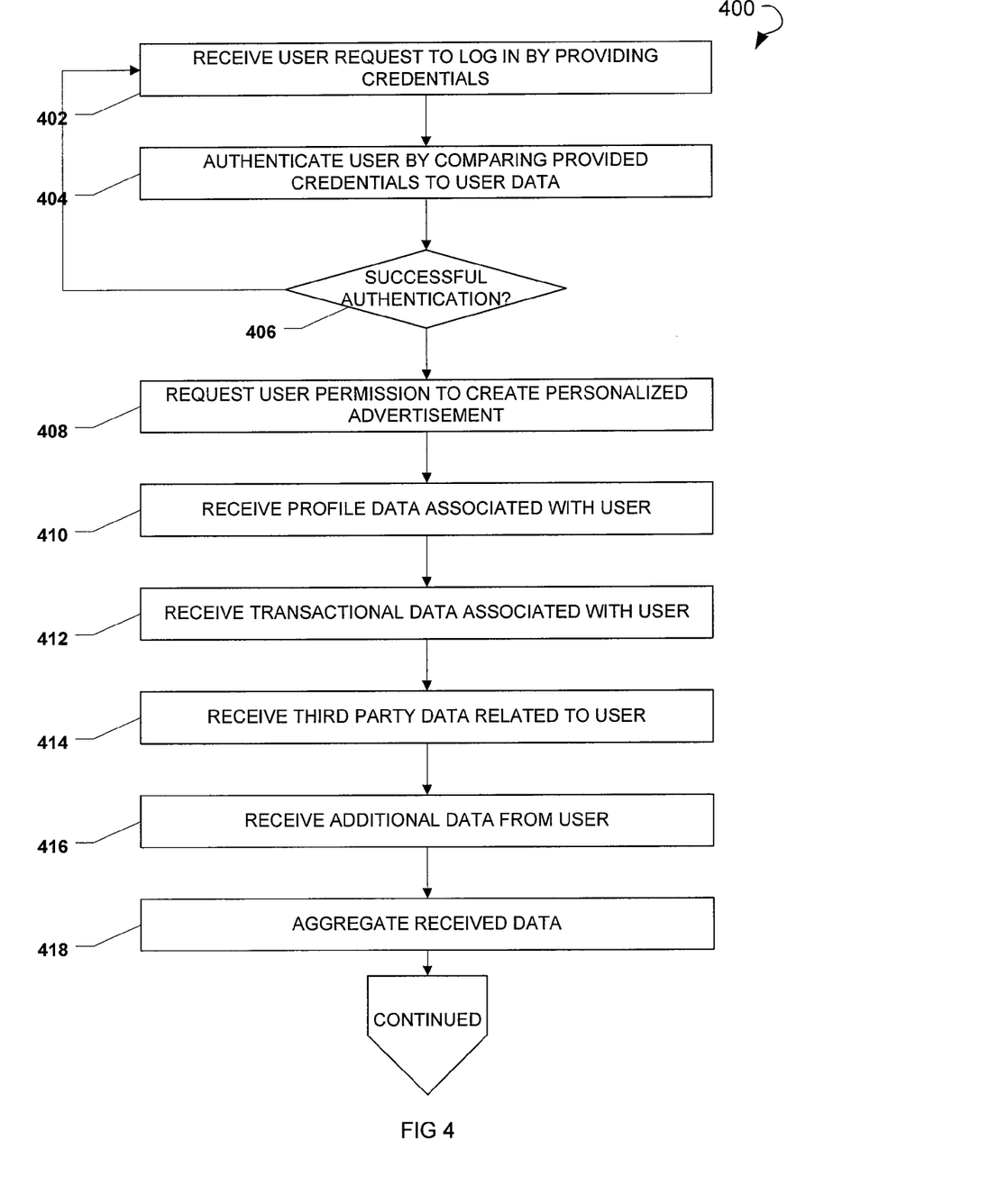
FIG. 4 is the first part of a flow chart illustrating an embodiment of a method for visualization of data to create a personalized advertisement, in accordance with an example embodiment.

FIG. 4 is the first part of a flow chart illustrating an embodiment of a method for visualization of data to create a personalized advertisement, in accordance with an example embodiment. As shown in FIG. 4, the method 400 may commence at operation 402, with the communication module 202 receiving user authentication data. Logging (or signing) in and out is the process by which individual access to a computer system is controlled by identification of the user in order to obtain credentials to permit access. A user may log in to a system to obtain access, and then log out when the access is no longer needed.

Upon successful authentication of user credentials, the user may be "signed-in" on the electronic marketplace 130. Once the user is signed-in on a website, various databases may be accessed and user data received. The data received may then be analyzed to determine, for example, the user's spending patterns. Thus, it may be determined from the data received by the receiving module 204 that the user is a buyer and has recently purchased a new TV or that that the user has spent large amounts of money lately buying other merchandise. Accordingly, expensive TV related equipment may be advertised to the user. Additionally, the user profile and the user related third party data may be utilized to dynamically create a data visualization.

Thus, at operation 404 the user authentication module 204 may establish the identity of the user based on the user authentication data received at operation 402 and at decision block 406 the user authentication module 204 may determine whether there was a successful identification of the user. If there was no successful user authentication, method 400 may proceed to operation 402 where a request to re-attempt the log-in may be displayed to the user.

If, on the other hand, the user is successfully authenticated by the user authentication module, user data may be obtained. As already mentioned above, in some example embodiments, it may be decided that the data available is not sufficient to create desired data visualization. In such case, the additional data requesting module 214 may request user permission to create personalized advertisements at operation 408.

In some example embodiments, the additional data module 214 may be utilized to request user permission to access user data in order to create data visualization. Furthermore, a user may be separately requested to permit third parties to provide user data. Upon successful login, the user may be requested to allow access for a certain period of time (e.g., 18 months).

One of the utilities of data visualization is targeted advertisement. Targeted advertisements may be a more efficient use of resources because advertisements are not sent to people that are not interested in the product. In some example embodiments, the additional data requesting module 214 may ask users to provide permissions via an opt-in for targeted advertisement.

Once permission is granted, the receiving module 206 may receive user profile data including user personal information at operation 410, and at operation 410, receive transactional data associated with user. The data received may include user feedback score, the percentage of the feedback that is positive, user's Skype ID, current date, and the user zip code. Based on the user zip code, the weather at the user location may be determined. The transaction data received by the receiving module 206 may include user related orders, invoices, payments, and activity records.

At operation 414, the receiving module 206 may receive third party data related to the user. The third party data provider 170 may be an organization specializing in public records information and offering service to consumers and businesses. Thus, data may be received from a range of resources including the electronic marketplace 130 and the third party data provider 170.

In some example embodiments, user accounts may be linked with a third party account and subsequent log-ins onto the electronic marketplace 130 may result in automatic log-ins onto the third party data provider 170. In some example embodiments, when the user refuses to give the permission for personalized advertisement or the user cannot be identified, it may still be possible to create a data visualization that does not hold or is not based on a user's personal data.

At operation 416, the receiving module 206 may receive additional data requested by the additional data requesting module 214 when it is determined that such information would be helpful.

At operation 418, the data aggregating module 208 may aggregate the data received at operations 410, 412, 414, and 416. Thus freely available information, user data, and the data that the user is subscribed to may be aggregated in order to create data visualization. There may be different versions of the data visualization such as a private version, a public version, and/or a version for friends and family. The visualization is not limited to still images and may be animated.

Figure 5:
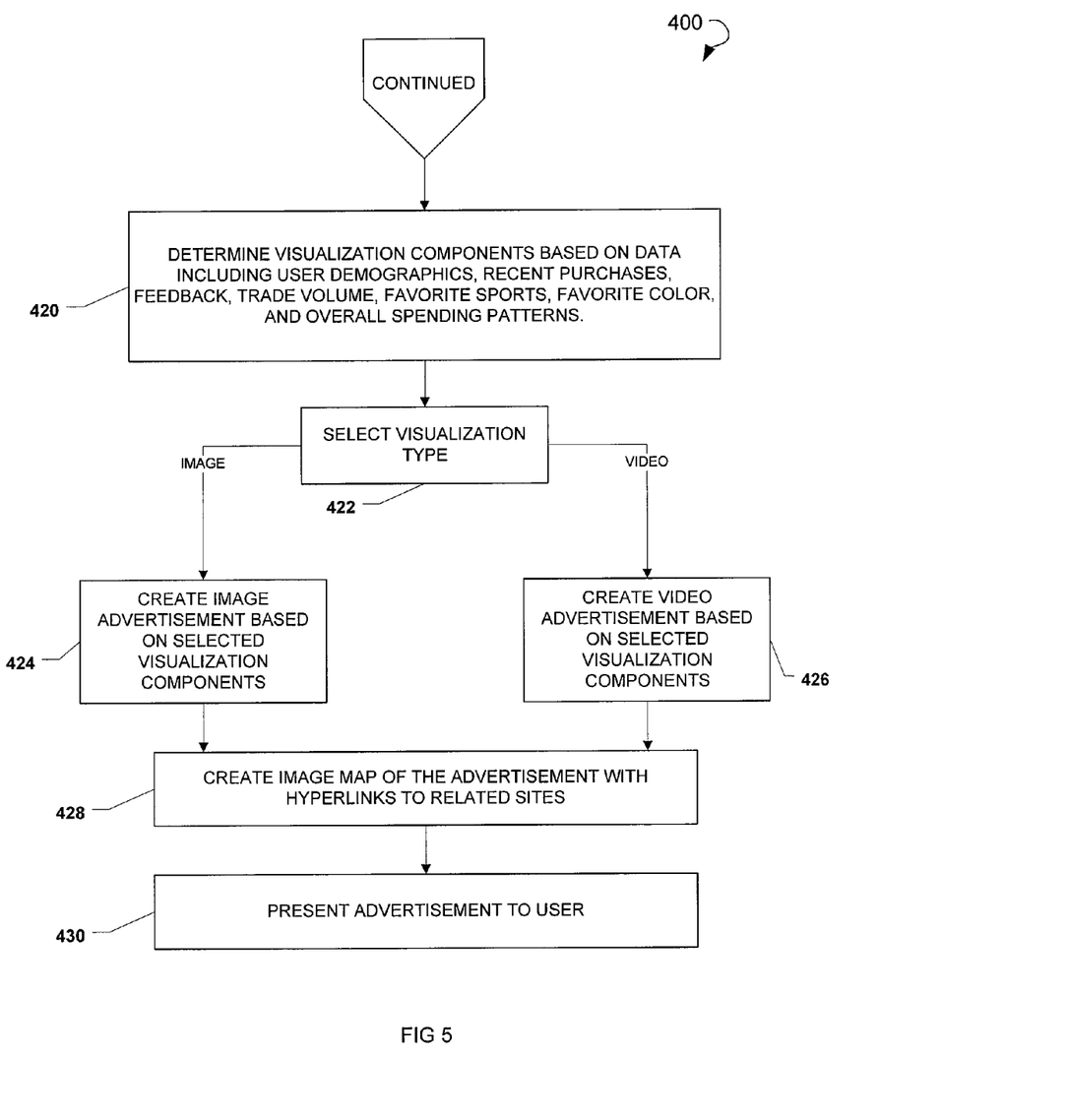
FIG. 5 is the second part of a flow chart illustrating an embodiment of a method for visualization of data to create a personalized advertisement, in accordance with an example embodiment.

FIG. 5 is the second part of a flow chart illustrating an embodiment of a method for visualization of data to create a personalized advertisement, in accordance with an example embodiment. Thus continued from FIG. 4, at operation 420, the data visualization module 210 may visualize the aggregated data based on data components, received from various above mentioned sources, such as demographics of the user, recent purchases, feedback, trade volume, favourite sports, favourite colour, and overall spending patterns. In some example embodiments, the spending patterns in a certain period of time are analyzed (e.g., last 20 things purchased).

For example, based on the zip code, the current cable TV provider of the area can be determined. Furthermore, it may be determined from the user transaction history that the user has recently acquired a new TV capable of receiving a high definition TV signal. Based on this data, a customized advertisement of high definition TV channels offered by the cable TV provider may be presented to the user. In another example, it may be determined that the user has recently acquired a new Blu-Ray Disk player. Based on this data, a visualization depicting a customized advertisement of Blu-Ray Discs may be created.

Data visualization, within the context of this disclosure, may refer to any technique for creating images, diagrams, or animations to communicate a message. Data visualization through visual imagery may be an effective way to communicate data. At operation 422, the data visualization module may select a visualization type such as image or video.

If image is selected as an option at operation 422 then a data visualization depicting an image is created at operation 424. The image may feature a specialized advertisement. If on the other hand, a video is selected than an advertisement video is created based on selected visualization components at operation 426. The data visualization may be created by merging visual components corresponding to the data components selected from various databases. The visual components may be assembled on a visual template provided by the Application Programming Interface (API) of a computer language utilized to create the data visualization.

Thus, textual data obtained from various databases may be merged with a graphical database to generate an image or a video that may be dynamically updated on demand and displayed to the user. For example, the Hypertext Preprocessor (PHP) computer language may be utilized for real-time generation of the data visualization. PHP may be utilized to dynamically generate images as well as Adobe® Flash® content.

At operation 428, the data visualization module 210 may create an image map of advertisement hyperlinks to related sites. The map fosters an association of the data visualization with an image map which includes a list of coordinates on the data visualization so that the areas of the data visualization are hyperlinked to the related locations. If, for example, the data visualization is a map of the world, each country may be hyperlinked to further information about that country. At operation 430, the data visualization module 210 may present advertisements to the user.

Figure 6:
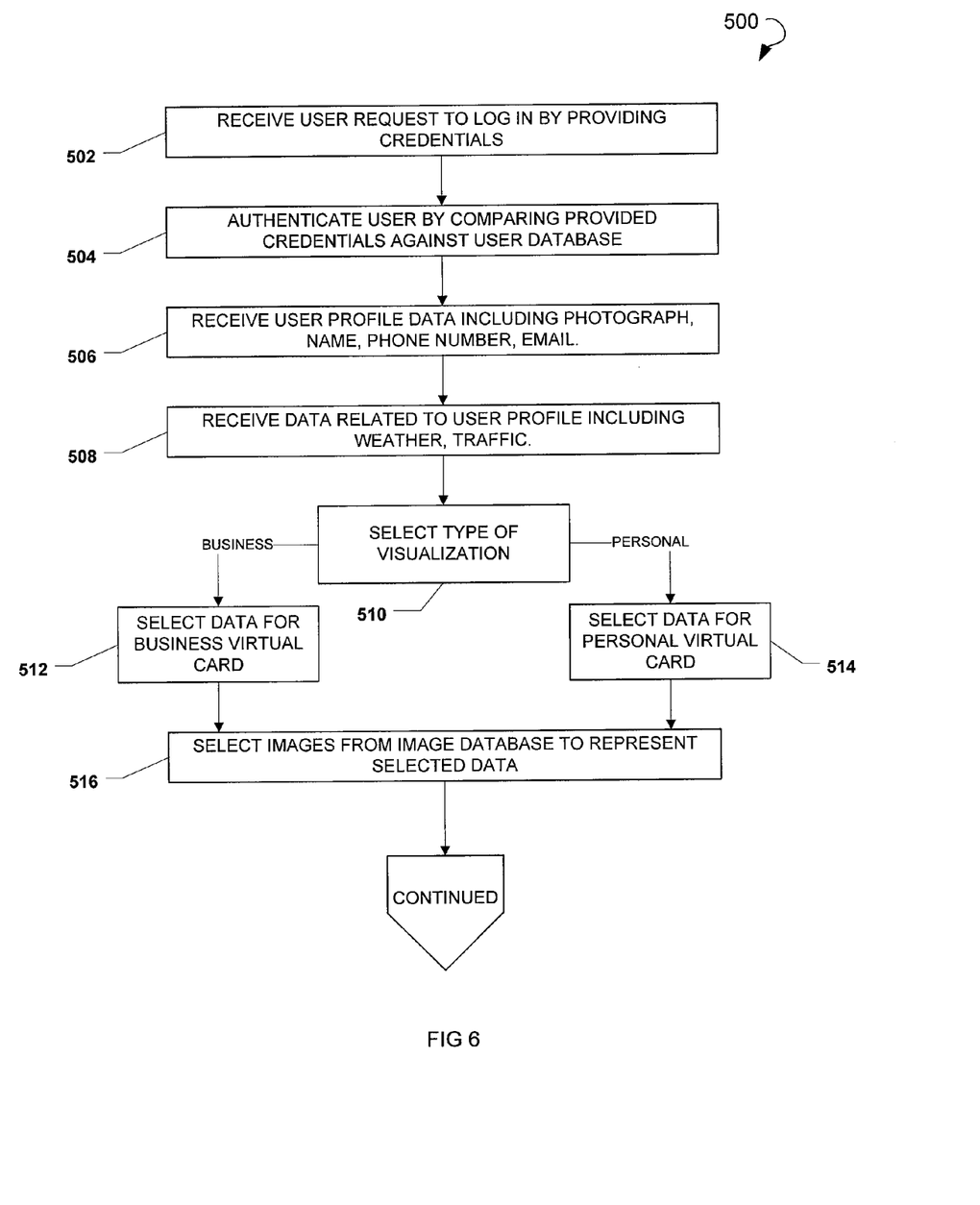
FIG. 6 is the first part of a flow chart illustrating an embodiment of a method for visualization of data to create a personalized virtual card, in accordance with an example embodiment.

FIG. 6 is the first part of a flow chart showing an embodiment of a method for visualization of data to create a personalized virtual card, in accordance with an example embodiment. As shown in FIG. 6, the method 500 may commence at operation 502 with the communication module 202 receiving a user request to log in by providing credentials. An example method of user authentication is described above in more detail with reference to FIG. 4.

At operation 504, the authentication module 204 authenticates a user by comparing provided credentials against a user database and at operation 506, the receiving module 206 may receive user profile data (e.g., photograph, name, phone number). At operation 508, the receiving module 206 may receive user profile data or data related to user profile (e.g., weather). The electronic marketplace 130 may subscribe to such related data as weather. Because the user zip code is known, the zip code may be correlated with a continuously updated data feed concerning the weather. Subsequently, the weather visual component may be added to the data visualization.

At operation 510, the data visualizing module may select a type of visualization such as business or personal. Depending on the type selected, different data visualizations representing personality of the user may be created. The data visualization may also be presented as an avatar that may be utilized to represent a user on a social network website. Thus, if business is selected then at operation 512, the data visualization module 210 may select data suitable for a business-related virtual card. If, on the other hand, personal is selected, than at operation 514, the data visualization module 210 may select data suitable for a personal virtual card.

At operation 516, the data visualization module 210 may select data for a personalized virtual card and at operation 518, the data visualization module 210 may select images from an image data base to represent the selected data in the data visualization.

Figure 7:
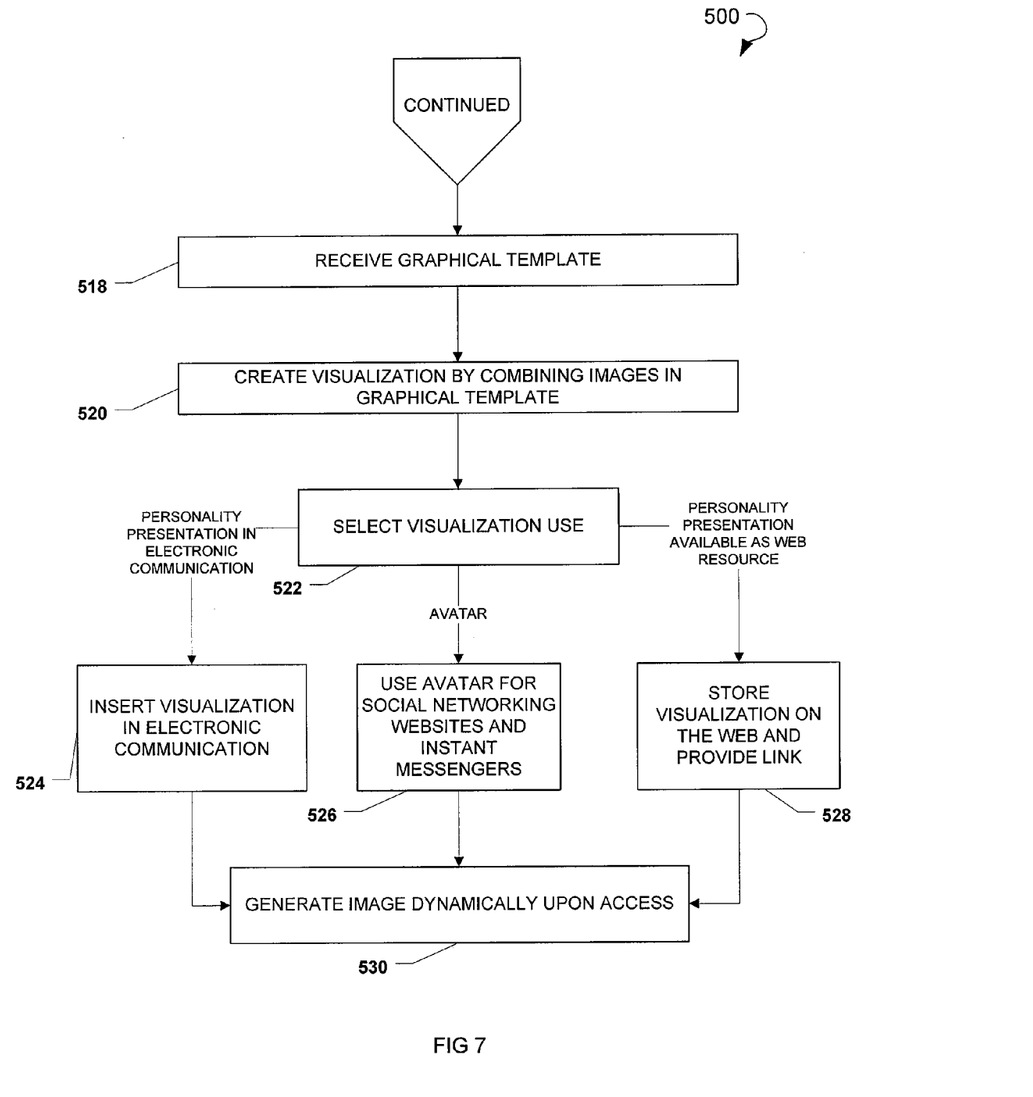
FIG. 7 is the second part of a flow chart illustrating an embodiment of a method for visualization of data to create a personalized virtual card, in accordance with an example embodiment.
Figure 8:
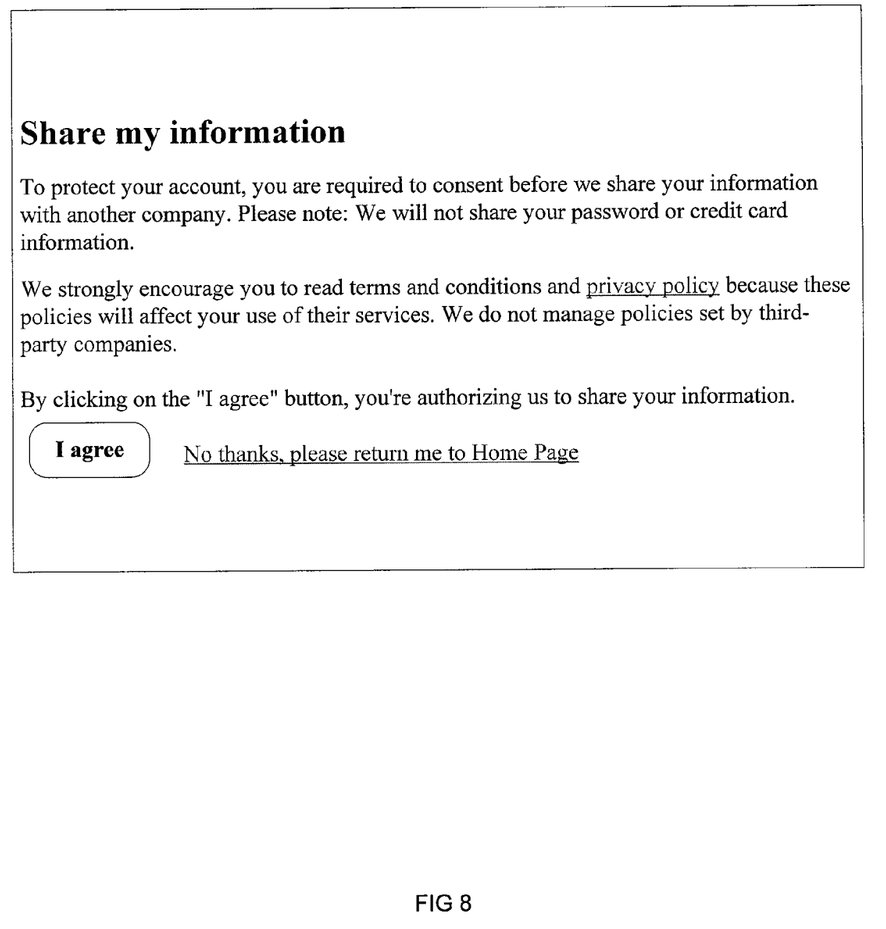
FIG. 8 illustrates a permission requesting web page utilized by systems and methods for visualization of data, in accordance with an example embodiment.

FIG. 7 is the second part of a flow chart showing an embodiment of a method for visualization of data to create a personalized virtual card, in accordance with an example embodiment. Continued from FIG. 6, method 500 may proceed to receive a graphical template for visual layers in operation 520. At operation 522, the data visualization module 210 may create data visualization by combining images in a graphical template. Example data visualization is illustrated in FIG. 8.

The data visualization module 210 may generate the data visualization by inserting the selected visual data from an image template. The resource storing module 212 may be utilized to store the data visualization as a web resource and to provide the URL of the web resource with a communication.

At operation 524, the data visualization module 210, depending on the intended use of the visualization, may insert visualization in electronic communication at operation 526. The data visualization stored as a web resource may be recreated upon access if its data components have changed. For example, if the data visualization may include current weather. When the weather changes from sunny to rainy the data visualization may be recreated on access. In some example embodiments, the data visualization provided in a communication may be dynamically updated upon receipt of the communication by the recipient. At operation 528 the data visualization for social networking websites (e.g., MySpace, Facebook), instant messengers (e.g., Skype) or a customizable internet portal (e.g., iGoogle) may be created.

In some example embodiments, the data visualization may include a user's email address, a photograph of the user, and/or a graphical representation of the user personality such as an avatar. The term avatar, as used within the context of the instant disclosure, may refer to the personality connected with an Internet user. At operation 530, the resource storing module 212 may store the data visualization on the web as a web resource and provide a hyperlink to the intended recipient. At operation 532, the data visualization module 210 may generate an image dynamically with each access.

Figure 9:
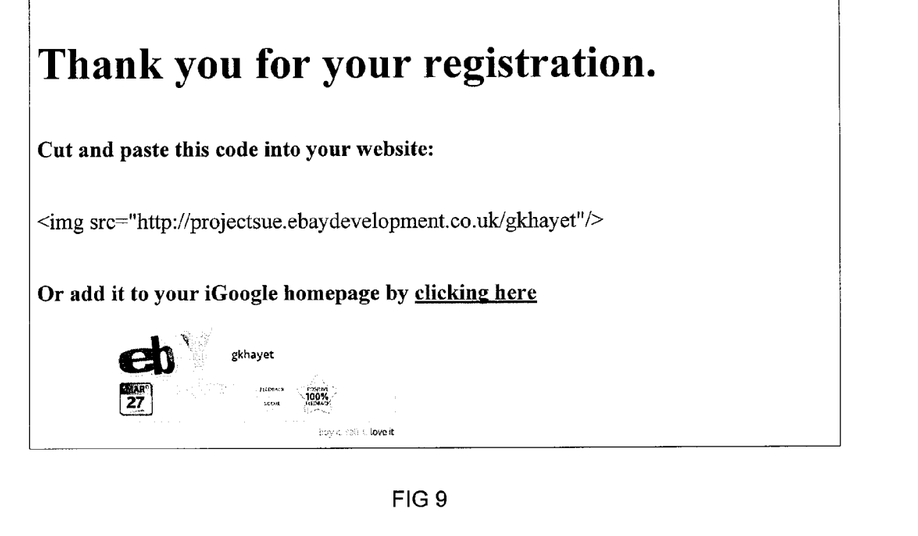
FIG. 9 illustrates a visualization of data, in accordance with an example embodiment.
Figure 10:
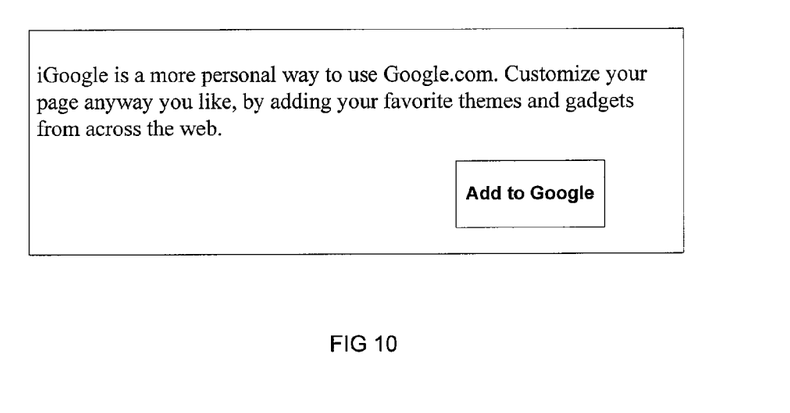
FIG. 10 illustrates a web page permitting utilization of a visualization of data as a widget, in accordance with an example embodiment.

FIG. 8 illustrates a permission requesting web page utilized by systems and methods for visualization of data, in accordance with an example embodiment. FIG. 9 illustrates a visualization of data, in accordance with an example embodiment. As shown in FIG. 9 data from various sources may be visualized to create a user personality card. Calendar, eBay feedback score, percentage of the user eBay positive feedback, and user eBay login name shown may be included in the visualization of data. FIG. 10 toe illustrates a web page enabling utilization of the visualization of data as a widget, in accordance with an example embodiment.

Figure 11:
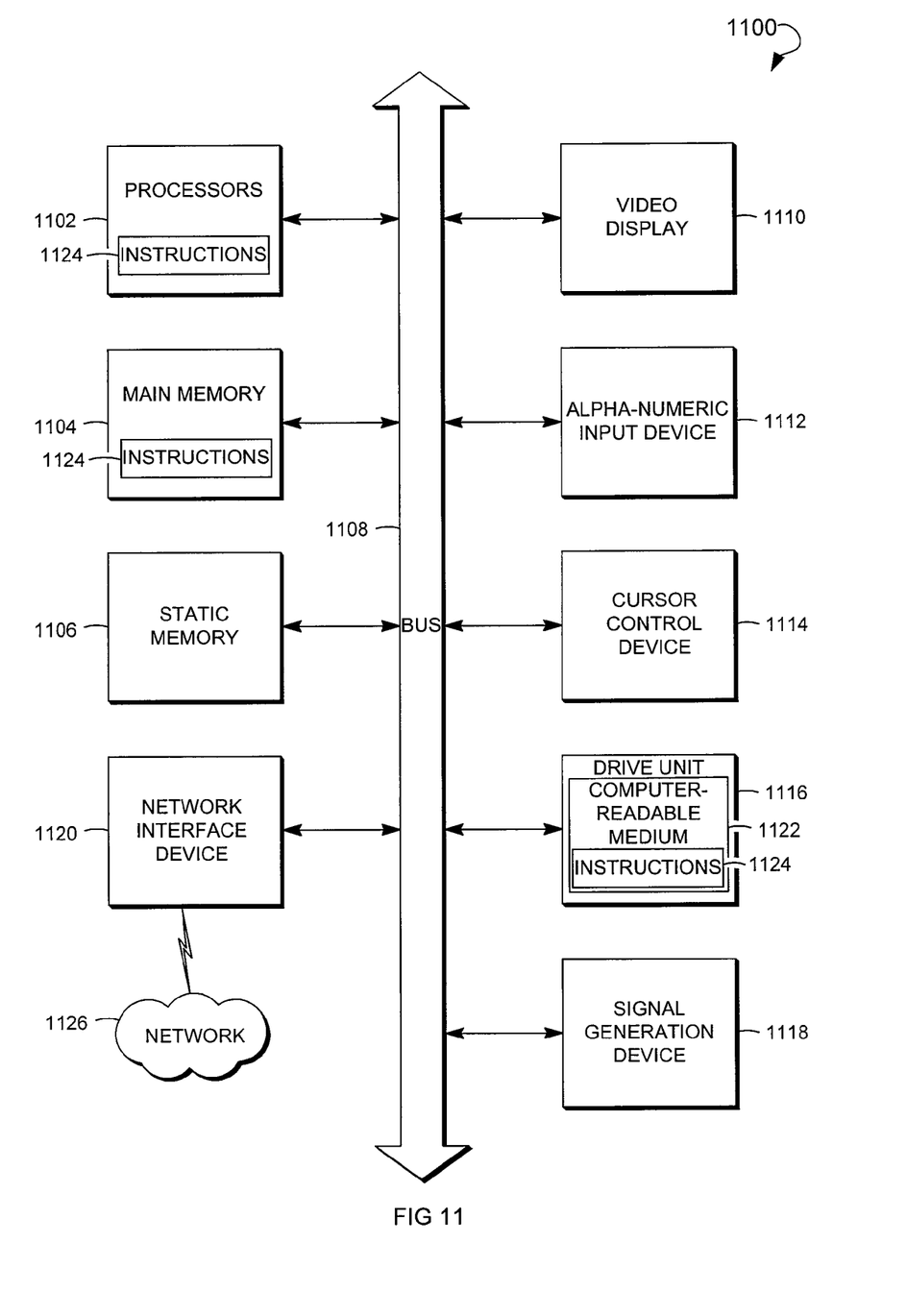
FIG. 11 illustrates a diagrammatic representation of an example machine in the form of a computer system within which a set of instructions, for causing the machine to perform any one or more of the methodologies discussed herein, may be executed.

FIG. 11 illustrates a diagrammatic representation of a machine in the example electronic form of a computer system 1100, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, a switch or bridge, or any machine capable of executing a set of instructions (sequential or otherwise) that specifies actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor or multiple processors 1102 (e.g., a central processing unit (CPU), a graphics processing unit (GPU), or both), and a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 may also include an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a computer-readable medium 1122 on which is stored one or more sets of instructions and data structures (e.g., instructions 1124) embodying or utilized by any one or more of the methodologies or functions described herein. The instructions 1124 may also reside, completely or at least partially, within the main memory 1104 and/or within the processors 1102 during the execution thereof by the computer system 1100. The main memory 1104 and the processors 1102 may also constitute machine-readable media.

The instructions 1124 may further be transmitted or received over a network 1126 via the network interface device 1120 utilizing any one of a number of well-known transfer protocols (e.g., Hyper Text Transfer Protocol (HTTP)).

While the computer-readable medium 1122 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a system and method for visualization of data have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method comprising:
   establishing an identity of a user based on authentication data of the user;
   accessing profile data describing the user and transaction data describing one or more transactions performed by the user;
   automatically selecting the profile data and the transaction data that is pertinent to an objective of a subsequent data visualization;
   aggregating the selected profile data with the selected transaction data, the aggregating being performed by one or more hardware processors and resulting in aggregated user data;
   generating a personality card for the user, the personality card being a data visualization of the aggregated user data;
   providing an image source location of the personality card and an instruction for embedding the personality card at a website;
   receiving a Hyper Text Transfer Protocol (HTTP) request from a client accessing the website, the HTTP request indicating the image source location, the client being associated with another user;
   in response to the HTTP request from the client accessing the website, re-generating the personality card based on a determination that a portion of the aggregated user data has changed, the re-generating of the personality card including merging visual components corresponding to textual components included in the aggregated user data according to a visual template; and
   embedding the re-generated personality card at the website in response to receiving the HTTP request from the client accessing the website.

2. The method of claim 1, wherein the data visualization is an image.

3. The method of claim 1, wherein the data visualization is a video.

4. The method of claim 1, wherein the data visualization is a personalized virtual card.

5. The method of claim 4, wherein the personalized virtual card is an avatar, the avatar being a graphical representation of a personality of the user based on the aggregated data.

6. The method of claim 4, wherein the aggregating of the profile data with the transaction data is based on one or more of the following: a location, a language, a favorite sport, or a favorite color.

7. The method of claim 1, wherein the data visualization is a personalized advertisement.

8. The method of claim 1, wherein the aggregating of the profile data with the transaction data is based on one or more of the following: demographics, personal preferences, recently purchased merchandise, feedback, trade volume, or spending patterns.

9. The method of claim 1, wherein the data visualization is associated with an image map, the image map being a list of coordinates relating to areas within the data visualization to enable hyperlinking of the areas to related locations.

10. The method of claim 1, further comprising:
requesting the user to provide additional data;
receiving the additional data from the user; and
aggregating the additional data with the aggregated data to produce enhanced aggregated data.

11. The method of claim 1, wherein at least a part of the transaction data is received from a third party data provider.

12. The method of claim 1, further comprising:
storing the data visualization as a resource; and
re-creating the data visualization upon being accessed.

13. A system comprising:
a non-transitory machine-readable medium for storing instructions that, when executed by one or more hardware processors, cause the one or more hardware processors to perform operations comprising:
establishing an identity of a user based on authentication data of the user;
accessing profile data describing the user and transaction data describing one or more transactions performed by the user;
automatically selecting the profile data and the transaction data that is pertinent to an objective of a subsequent data visualization;
aggregating the selected profile data with the selected transaction data to produce aggregated user data;
generating a personality card for the user, the personality card being a data visualization of the aggregated user data;
providing an image source location of the personality card and an instruction for embedding the personality card at a website;
receiving a Hyper Text Transfer Protocol (HTTP) request from a client accessing the website, the HTTP request indicating the image source location, the client being associated with another user;
in response to the HTTP request from the client accessing the website, re-generating the personality card based on a determination that a portion of the aggregated user data has changed, the re-generating of the personality card including merging visual components corresponding to textual components included in the aggregated user data according to a visual template; and
embedding the re-generated personality card at the website in response to receiving the HTTP request from the client accessing the website.

14. The system of claim 13, wherein the operations further comprise:
producing the data visualization, the data visualization being an image.

15. The system of claim 13, wherein the operations further comprise:
producing the data visualization, the data visualization being a video.

16. The system of claim 13, wherein the operations further comprise:
producing the data visualization, the data visualization being a personalized virtual card.

17. The system of claim 13, wherein the operations further comprise:
aggregating the profile data with the transaction data based on one or more of the following: a location, a language, a favorite sport, or a favorite color.

18. The system of claim 13, wherein the operations further comprise:
producing the data visualization, the data visualization being a personalized advertisement image.

19. The system of claim 13, wherein the operations further comprise:
aggregating the profile data with the transaction data based on one or more of the following: demographics, personal preferences, recently purchased merchandise, feedback, trade volume, or spending patterns.

20. The system of claim 13, wherein the operations further comprise:
producing the data visualization, the data visualization to be associated with an image map, the image map being a list of coordinates relating to areas within the data visualization, created in order to link the areas to related locations.

21. The system of claim 13, wherein the operations further comprise:
requesting the user to provide additional data and to receive the additional data from the user; and
aggregating the additional data with the aggregated data to produce enhanced aggregated data.

22. The system of claim 13, wherein the operations further comprise:
storing a re-creation of the data visualization upon each access.

23. The system of claim 13, wherein the operations further comprise:
storing the data visualization as a resource; and
visualizing the aggregated user data and to produce a recreated data visualization upon the resource being accessed.

24. A non-transitory machine-readable medium comprising instructions that, when executed by one or more hardware processors, cause the one or more hardware processors to perform operations comprising:
establishing an identity of a user based on authentication data of the user;
accessing profile data describing the user and transaction data describing one or more transactions performed by the user;
automatically selecting the profile data and the transaction data that is pertinent to an objective of a subsequent data visualization;
aggregating the selected profile data with the selected transaction data to produce aggregated user data;
generating a personality card for the user, the personality card being a data visualization of the aggregated user data;
providing an image source location of the personality card and an instruction for embedding the personality card at a website;
receiving a Hyper Text Transfer Protocol (HTTP) request from a client accessing the website, the HTTP request indicating the image source location, the client being associated with another user;
in response to the HTTP request from the client accessing the website, re-generating the personality card based on a determination that a portion of the aggregated user data has changed, the re-generating of the personality card including merging visual components corresponding to textual components included in the aggregated user data according to a visual template; and embedding the re-generated personality card at the website in response to receiving the HTTP request from the client accessing the website.

25. An apparatus comprising:

one or more hardware processors performing operations comprising:

establishing an identity of a user based on authentication data of the user;

accessing profile data describing the user and transaction data describing one or more transactions performed by the user;

automatically selecting the profile data and the transaction data that is pertinent to an objective of a subsequent data visualization;

aggregating the selected profile data with the selected transaction data to produce aggregated user data;

generating a personality card for the user, the personality card being a data visualization of the aggregated user data;

providing an image source location of the personality card and an instruction for embedding the personality card at a website;

receiving a Hyper Text Transfer Protocol (HTTP) request from a client accessing the website, the HTTP request indicating the image source location, the client being associated with another user;

in response to the HTTP request from the client accessing the website, re-generating the personality card based a determination that a portion of the aggregated user data has changed, the means for re-generating the personality card including means for merging visual components corresponding to textual components included in the aggregated user data according to a visual template; and embedding the re-generated personality card at the website in response to receiving the HTTP request from the client accessing the website.

\* \* \* \* \*